US012811127B2

(12) United States Patent
Seo et al.

(10) Patent No.: US 12,811,127 B2
(45) Date of Patent: Nov. 24, 2026

(54) AIR LIFT DEVICE AND DRYING DEVICE FOR MANUFACTURING ELECTRODE COMPRISING SAME

(71) Applicant: LG Energy Solution, Ltd., Seoul (KR)

(72) Inventors: Sang Jin Seo, Daejeon (KR); Chang Bum Ahn, Daejeon (KR); Yeong Cheol Jang, Daejeon (KR); Jea Bong Jung, Daejeon (KR); Tae Yeon Kim, Daejeon (KR); Doo Hyun Lee, Deajeon (KR)

(73) Assignee: LG Energy Solution, Ltd., Seoul (KR)

( * ) Notice: Subject to any disclaimer, the term of this patent is extended or adjusted under 35 U.S.C. 154(b) by 456 days.

(21) Appl. No.: 18/571,821

(22) PCT Filed: Feb. 28, 2023

(86) PCT No.: PCT/KR2023/002757
§ 371 (c)(1),
(2) Date: Dec. 19, 2023

(87) PCT Pub. No.: WO2023/167480
PCT Pub. Date: Sep. 7, 2023

(65) Prior Publication Data

US 2024/0332479 A1 Oct. 3, 2024

(30) Foreign Application Priority Data

Mar. 3, 2022 (KR) ........................ 10-2022-0027114

(51) Int. Cl.
*H01M 4/04* (2006.01)
*B65H 27/00* (2006.01)

(52) U.S. Cl.
CPC .......... *H01M 4/0404* (2013.01); *B65H 27/00* (2013.01); *B65H 2406/111* (2013.01); *B65H 2406/113* (2013.01)

(58) Field of Classification Search
CPC ............... H01M 4/04; B65H 2406/111; B65H 2406/113
See application file for complete search history.

(56) References Cited

U.S. PATENT DOCUMENTS 4,292,745 A 10/1981 Caratsch
5,452,834 A 9/1995 Mariotti et al.
(Continued)

FOREIGN PATENT DOCUMENTS

JP H10228898 A 8/1998
JP 2006019396 A 1/2006
(Continued)

OTHER PUBLICATIONS

Machine generated translation of JP 2019150784 A.*
(Continued)

*Primary Examiner* — Ngoc T Nguyen
(74) *Attorney, Agent, or Firm* — Lerner David LLP

(57) ABSTRACT

An air lift device and a drying device for manufacturing an electrode, where the air lift device related to one comprises a main body, including a space part into which air is introduced, a spray part through which the air in the space part is sprayed to the outside toward a coated electrode, a membrane member which is disposed in the main body to face the space part and is extensible, and a press part differently setting a spray pressure of the air sprayed toward a coated portion and a spray pressure of the air sprayed toward an uncoated portion by pressurizing a partial region of the membrane member.

15 Claims, 2 Drawing Sheets

(56) References Cited

U.S. PATENT DOCUMENTS

| | | | | |
|---|---|---|---|---|
| 6,159,171 A * | 12/2000 | Densert | A61M 13/003 |
| | | | 601/76 |
| 7,311,234 B2 * | 12/2007 | Solberg | B65H 23/24 |
| | | | 226/193 |

FOREIGN PATENT DOCUMENTS

| | | | | |
|---|---|---|---|---|
| JP | 2006264891 | A | | 10/2006 |
| JP | 2019150784 | A | * | 9/2019 |
| KR | 102095447 | B1 | | 3/2020 |
| KR | 20200118606 | A | | 10/2020 |
| KR | 20220013672 | A | | 2/2022 |

OTHER PUBLICATIONS

International Search Report for PCT/KR2023/002757 mailed Jun. 15, 2023. 3 pages.

Extended European Search Report including Written Opinion for Application No. 23763679.0 dated Jan. 14, 2025. 12 pages.

Search Report dated Mar. 9, 2026 from the Office Action for Chinese Application No. 202380012396.9 issued Mar. 11, 2026, p. 1-2.

* cited by examiner

[Figure 1]
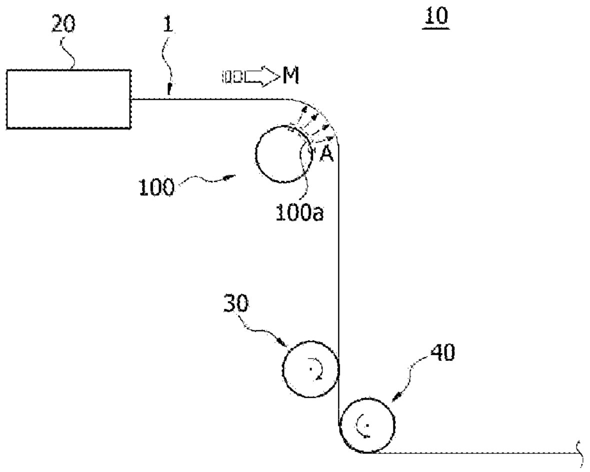
[Figure 2]
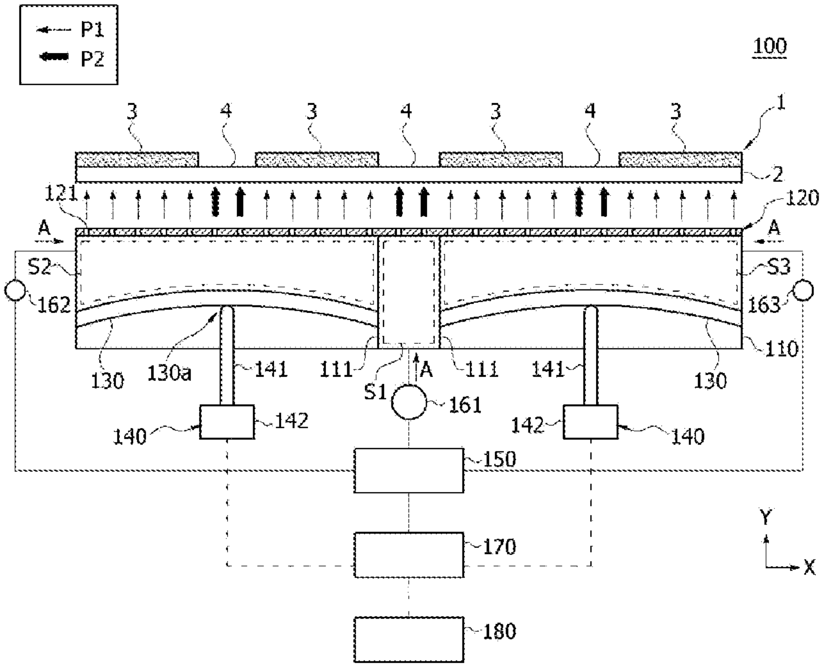

[Figure 3]
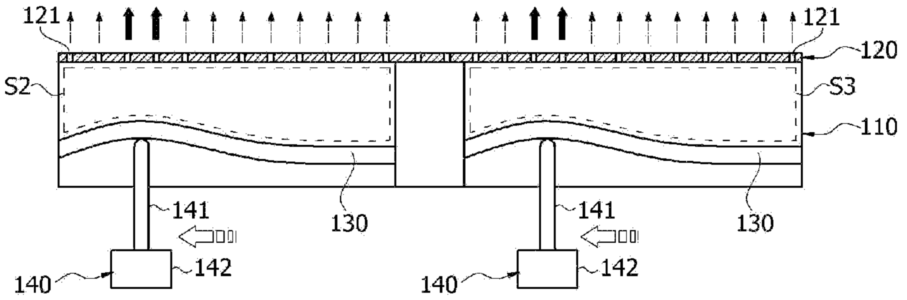
[Figure 4]
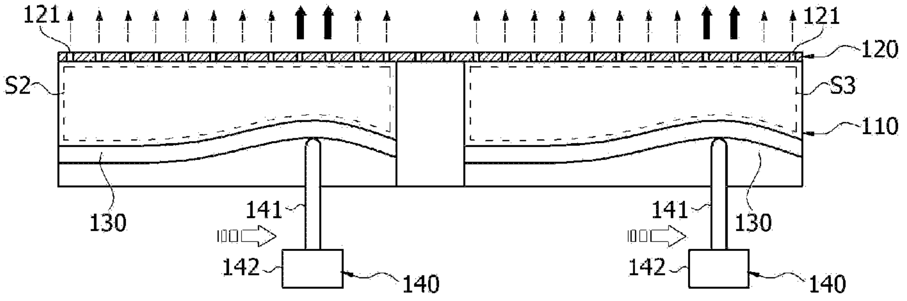

AIR LIFT DEVICE AND DRYING DEVICE FOR MANUFACTURING ELECTRODE COMPRISING SAME

CROSS-REFERENCE TO RELATED APPLICATIONS

The present application is a national phase entry of 35 U.S.C. § 371 of International Application No. PCT/KR2023/002757, filed on Feb. 28, 2023, which claims priority from Korean Patent Application No. 10-2022-0027114, filed on Mar. 3, 2022, all of which are incorporated herein by reference.

TECHNICAL FIELD

The present invention relates to an air lift device capable of preventing occurrence of wrinkles in an uncoated portion corresponding to an uncoated portion position and a coating pattern of a coated electrode, and a drying device for manufacturing an electrode comprising the same.

BACKGROUND ART

An electrode process among manufacturing processes of a lithium secondary battery is divided into an active material mixing process, an electrode coating process, a drying process, and a slitting process.

After the electrode coating process, the drying process of removing a solvent in a slurry using heat is performed.

Meanwhile, after performing the drying process, the coated electrode discharged from a drying part has a thermal expansion deviation between a coated portion coated with an electrode slurry (also referred to as a 'coating portion') and an uncoated portion uncoated with an electrode slurry. Such a thermal expansion deviation causes a problem of wrinkles in the traveling direction in the uncoated portion while the coated electrode travels.

In order to improve wrinkles in the uncoated region of the coated electrode, a roller physically contacting the coated electrode to smooth out wrinkles or folds has been used. However, since a separate space is required to introduce such a roller, and it is difficult to change the structure once installed, there is a problem of low processability.

Meanwhile, since the size of the coated electrode, and the arrangement pattern (coating pattern) of the coated portion and the uncoated portion change for each product model, a technique for preventing wrinkles from forming on the uncoated portion of the coated electrode in response to the changed coating pattern is required.

SUMMARY

Technical Problem

In a process of lifting a coated electrode by spraying air thereto, it is a problem to be solved by the present invention to provide an air lift device capable of differently setting spray pressures of air for each region of the coated electrode in response to a coating pattern and a position of an uncoated portion of the coated electrode, and a drying device for manufacturing an electrode comprising the same.

In addition, when lifting a coated electrode after performing a drying process, it is a problem to be solved by the present invention to provide an air lift device capable of preventing wrinkles from occurring in an uncoated portion in a traveling process by spraying air to the uncoated portion side of the coated electrode at a higher pressure than a coated portion, and a drying device for manufacturing an electrode comprising the same.

Technical Solution

In order to solve the above problems, according to one aspect of the present invention, an air lift device for lifting a coated electrode having a coated portion coated with an electrode slurry and an uncoated portion uncoated with an electrode slurry while driving is provided, wherein the air lift device comprises a main body including a space part into which air is introduced, and a spray part through which the air in the space part is sprayed to the outside toward a coated electrode, a membrane member which is disposed in the main body to face the space part, and is extensible, and a press part provided to differently set a spray pressure of the air sprayed toward the coated portion and a spray pressure of the air sprayed toward the uncoated portion through the spray part in the space part by pressurizing a partial region of the membrane member.

The press part is provided to set the spray pressure of the air sprayed toward the uncoated portion higher than the spray pressure of the air sprayed toward the coated portion.

Also, the press part may comprise a pressurizing member contacting the membrane member and disposed to extend the region of the contacted membrane member toward the spray part, and a driving part for moving the pressurizing member within the main body so that the contact position between the pressurizing member and the membrane member is adjusted.

In addition, the pressurizing member may be disposed to contact the region of the membrane member facing the uncoated portion of the coated electrode, the membrane member may be convexly extended toward the spray part by the pressurizing member, and the region where the membrane member is convexly extended may have a spray pressure larger than that of the surrounding region.

Furthermore, the driving part may be provided to move the pressurizing member along the direction where the coated portion and the uncoated portion of the coated electrode are sequentially arranged.

Also, the air lift device may further comprise an air supply part provided to supply air into the space part, and the air supply part may comprise a regulator for adjusting a flow rate of air.

In addition, the main body may have a plurality of space parts along the direction where the coated portion and the uncoated portion of the coated electrode are sequentially arranged, and the plurality of space parts may comprise a first space part, and second and third space parts located on both sides of the first space part, respectively. At this instance, the membrane member and the press part may be individually provided in the second and third space parts.

Furthermore, the air lift device may further comprise an air supply part provided to supply air into the first to third space parts, and the air supply part may comprise a plurality of regulators for individually adjusting the flow rates of air supplied to the respective space parts.

In addition, the spray part may comprise a plurality of spray holes.

According to another aspect of the present invention, a drying device for manufacturing an electrode comprising a drying part for drying a coated electrode, coated with an electrode slurry, and an uncoated portion, and a transfer part moving the coated electrode passing through the drying part in the traveling direction is provided.

Also, the transfer part comprises one or more traveling rolls contacting an air lift device provided to lift the coated electrode while traveling using air, and the coated electrode, and moving the coated electrode along the traveling direction.

In addition, the air lift device comprises a main body including a space part into which air is introduced, and a spray part through which the air in the space part is sprayed to the outside toward a coated electrode, a membrane member which is disposed in the main body to face the space part, and is extensible, and a press part differently setting a spray pressure of the air sprayed toward the coated portion and a spray pressure of the air sprayed toward the uncoated portion through the spray part in the space part by pressurizing a partial region of the membrane member.

Furthermore, the air lift device may be disposed in a section where the traveling direction of the coated electrode changes.

The press part is provided to set the spray pressure of the air sprayed toward the uncoated portion higher than the spray pressure of the air sprayed toward the coated portion.

Also, the press part may comprise a pressurizing member contacting the membrane member and disposed to extend the region of the contacted membrane member toward the spray part, and a driving part for moving the pressurizing member within the main body so that the contact position between the pressurizing member and the membrane member is adjusted.

In addition, the pressurizing member may be disposed to contact the region of the membrane member facing the uncoated portion of the coated electrode, the membrane member may be convexly extended toward the spray part by the pressurizing member, and the region where the membrane member is convexly extended may have a spray pressure larger than that of the surrounding region.

Furthermore, the driving part may be provided to move the pressurizing member along the direction where the coated portion and the uncoated portion of the coated electrode are sequentially arranged.

Also, the air lift device may further comprise an air supply part provided to supply air into the space part, and the air supply part may comprise a regulator for adjusting a flow rate of air.

In addition, the main body may have a plurality of space parts along the direction where the coated portion and the uncoated portion of the coated electrode are sequentially arranged, and the plurality of space parts may comprise a first space part, and second and third space parts located on both sides of the first space part, respectively. At this instance, the membrane member and the press part may be individually provided in the second and third space parts.

Furthermore, the air lift device may further comprise an air supply part provided to supply air into the first to third space parts, and the air supply part may comprise a plurality of regulators for individually adjusting the flow rates of air supplied to the respective space parts.

In addition, the spray part may comprise a plurality of spray holes.

Advantageous Effects

As described above, the air lift device related to one example of the present invention, and the drying device for manufacturing an electrode comprising the same have the following effects.

In a process of lifting a coated electrode by spraying air thereto, it is possible to differently set spray pressures of air for each region of the coated electrode in response to a coating pattern and a position of an uncoated portion of the coated electrode.

In addition, when lifting a coated electrode after performing a drying process, it is possible to prevent wrinkles from occurring in an uncoated portion in a traveling process by spraying air to the uncoated portion side of the coated electrode at a higher pressure than a coated portion.

DESCRIPTION OF DRAWINGS

FIG. 1 is a schematic diagram showing a drying device for manufacturing an electrode according to one example of the present invention.

FIG. 2 is a configuration diagram of an air lift device related to one example of the present invention.

FIGS. 3 and 4 are schematic diagrams for explaining one operating state of the air lift device shown in FIG. 2.

DETAILED DESCRIPTION

Hereinafter, an air lift device according to one example of the present invention, and a drying device for manufacturing an electrode comprising the same will be described in detail with reference to the drawings.

In addition, regardless of the reference numerals, the same or corresponding components are given by the same or similar reference numerals, duplicate descriptions thereof will be omitted, and for convenience of explanation, the size and shape of each component member as shown can be exaggerated or reduced.

FIG. 1 is a schematic diagram showing a drying device (10) for manufacturing an electrode according to one example of the present invention, and FIG. 2 is a configuration diagram of an air lift device (100) related to one example of the present invention.

The drying device (10) for manufacturing an electrode comprises a drying part (20) drying a coated electrode (1) that a coated portion (3) coated with an electrode slurry and an uncoated portion (4) uncoated with an electrode slurry are formed, and a transfer part moving the coated electrode (1) passing through the drying part (20) in the traveling direction (M).

In addition, the transfer part comprises one or more rolls (30, 40) contacting an air lift device (100) provided to lift the coated electrode (1) while traveling using air (A), and the coated electrode (1), moving the coated electrode (1) along the traveling direction (M).

The drying part (20) may comprise a chamber, and a plurality of heating lamps provided inside the chamber. The chamber has an inlet through which the coated electrode (1) that the electrode slurry is applied on an electrode base material enters, and an outlet through which the coated electrode (1) after completing the drying process is discharged. The air lift device (100) is disposed on the outlet side of the drying part (20). As one example, in the drying device (10) for manufacturing an electrode, the drying part (20), the air lift device (100), and one or more traveling rolls (30, 40) may be sequentially arranged along the traveling direction of the coated electrode (1). In addition, the air lift device (100) may be disposed in a section where the traveling direction of the coated electrode (1) changes. Referring to FIG. 1, for example, the air lift device (100) may be disposed in a section where the traveling direction is bent rather than a straight section of the traveling sections of the coated electrode (1).

In this document, the coated electrode (1) has an electrode base material (2), and a coating pattern in which a coated portion (3) coated with an electrode slurry and an uncoated portion (4) uncoated with an electrode slurry are sequentially arranged on the electrode base material (2). The coated portion (3) and the uncoated portion (4) may be alternately arranged sequentially along one direction (width direction, x-axis direction in FIG. 2) of the coated electrode (1). The uncoated portion (4) may be positioned between two adjacent coated portions (3), and for example, the coated electrode (1) may have two to eight coated portions (3). In addition, the coated portion (3) may be formed on one side or both sides of the electrode base material (2).

The air lift device (100) according to one example of the present invention cannot only lift the dried coated electrode (1) by spraying air (A) on the surface of the coated electrode (1), but can also prevent wrinkles capable of occurring in the uncoated portion (4) uncoated with the electrode slurry in advance by promoting cooling of the coated electrode (1).

In addition, the air lift device (100) is an air-floating type device floating the coated electrode (1) without contacting the coated electrode (1).

In particular, the air lift device (100) increases the spray pressure (P2) of the air applied to the uncoated portion (4) of the coated electrode (1) higher than the spray pressure (P1) of the air applied to the coated portion (3), whereby it is possible to prevent wrinkles from occurring in the uncoated portion (4) during traveling and cooling processes.

Referring to FIG. 2, the air lift device (100) comprises a main body (110), a membrane member (130), and a press part (140). In addition, the air lift device (100) may comprise an air supply part (150), and a control part (170) for controlling the press part (140) and the air supply part (150).

The air lift device (100) is an air floating device for lifting the coated electrode (1) having a coated portion (3) coated with an electrode slurry and an uncoated portion (4) uncoated with an electrode slurry while traveling.

The air lift device (100) comprises a main body (110) including a space part (for example, S2) into which air (A) is introduced, and a spray part (120) through which the air (A) in the space part (S2) is sprayed to the outside toward the coated electrode (1). For example, the main body (110) may have a roll form. The main body (110) may have a roll shape extending in the width direction (x-axis direction) of the coated electrode (1). In addition, the main body (110) may have a plurality of space parts (S1, S2, S3) partitioned through a partition wall (111). For example, as the plurality of partition walls (111) are disposed apart from each other within the main body (110) at a predetermined interval, a space part may be formed between the two partition walls (111).

The spray part (120) may comprise a plurality of spray holes (121). As one example, the spray part (120) may comprise a sheet made of porous carbon. The spray part (120) may be provided in a partial region (100*a*, also referred to as a spray region) of the main body (110) along the traveling direction (M) of the coated electrode.

In addition, the air lift device (100) comprises a membrane member (130) which is disposed in the main body (110) to face the space part (S2), and is extensible. The membrane member (130) may form a part of the boundary of the space part (S2), and change the shape of the space part (S2) when it is stretched. An end of the membrane member (130) may be bonded to the partition wall (111) defining the space part (S2) and disposed within the main body (110).

The membrane member (130) may be made of a material having elasticity such as rubber or silicone, and may be made of a material, which is changed by an external force and is restorable to its original state when the external force is removed.

The air lift device (100) comprises a press part (140) provided to differently set a spray pressure (P1) of the air sprayed toward the coated portion (3) and a spray pressure (P2) of the air sprayed toward the uncoated portion (4) through the spray part (120) in the space part (S2) by pressurizing a partial region of the membrane member (130).

In addition, the press part (140) may be provided to set a spray pressure (P2) of the air sprayed toward the uncoated portion (4) higher than a spray pressure (P1) of the air sprayed toward the coated portion (3).

As one example, the press part (140) may comprise a pressurizing member (141) contacting the membrane member (130) and disposed to extend the region (130*a*) of the contacted membrane member (130) toward the spray part (120), and a driving part (142) for moving the pressurizing member (141) within the main body (110) so that the contact position between the pressurizing member (141) and the membrane member (130) is adjusted. The driving part (142) may be composed of a pneumatic cylinder or a motor, and the like. The y-axis of FIG. 2 represents the spray direction of the air (A) toward the coated electrode (1).

FIGS. 3 and 4 are schematic diagrams for explaining one operating state of the air lift device shown in FIG. 2.

Referring to FIGS. 2 to 4, the pressurizing member (141) may be disposed to contact the region (130*a*) of the membrane member (130) facing the uncoated portion (4) of the coated electrode (1), the membrane member (130) may be convexly extended toward the spray part (120) by the pressurizing member (141), and the region (130*a*) where the membrane member (130) is convexly extended may have a spray pressure larger than that of the surrounding region. That is, by adjusting the position of the pressurizing member (141), it is possible to adjust the position of the region where the spray pressure of the air (A) discharged from the space part (S2) increases.

Also, the driving part (142) may be provided to move the pressurizing member (141) along the direction (the width direction of the coated electrode, the x-axis direction) where the coated portion (3) and the uncoated portion (4) of the coated electrode (1) are sequentially arranged. According to such a structure, in the process of lifting the coated electrode by spraying air thereto, it is possible to differently set spray pressures of air for each region of the coated electrode in response to a coating pattern and a position of an uncoated portion of the coated electrode. That is, when the position of the uncoated portion is changed or the coating pattern is changed according to the product standard, it is possible to provide a high spray pressure toward the uncoated portion at the changed position by moving the pressurizing member (141).

In addition, the air lift device (100) may comprise an air supply part (150) provided to supply air into the space part (S2), and the air supply part (150) may comprise a regulator (162) for adjusting the flow rate of air.

At this instance, air (e.g., compressed air) is continuously supplied to the space part (S2) in the main body (110) through the regulator, and the air in the space part (S2) is supplied toward the coated electrode (1) through the spray part (120), whereby the coated electrode (1) maintains a lifted state.

Also, an air filter for removing foreign substances in the air supplied to the space part (S2) may also be provided.

In addition, the main body (110) may have a plurality of space parts (S1, S2, S3) along the direction where the coated portion and the uncoated portion of the coated electrode are sequentially arranged. For example, the plurality of space parts may comprise a first space part (S1), and second and third space parts (S2, S3) located on both sides of the first space part (S1), respectively. The first to third space parts (S1, S2, S3) may be partitioned inside the main body (110) through the above-described partition wall (111).

At this instance, the membrane member (130) and the press part (140) may be individually provided in the second and third space parts (S2, S3).

That is, the second space part (S2) and the third space part (S3) each pressurize a partial region of the membrane member (130) through the press part (140), so that the spray pressures of air of different regions in the space parts (S2, S3) may be set differently.

Specifically, the second and third space parts (S2, S3) pressurize a partial region of the membrane member (130) through the press part (140), so that through the spray part (120) in the second and third space parts (S2, S3), the spray pressure of the air sprayed toward the coated portion (3) and the spray pressure of the air sprayed toward the uncoated portion (4) may be set differently.

In addition, the air lift device (100) may comprise an air supply part (150) provided to supply air into the first to third space parts (S1, S2, S3), and the air supply part (150) may comprise a plurality of regulators (161, 162, 163) for individually adjusting the flow rates of air supplied to the respective space parts (S1, S2, S3). In such a structure, the flow rates and pressures of air supplied to the respective space parts (S1, S2, S3) may be individually set.

Referring to FIG. 2, for example, the coated electrode (1) may have four coated portions (3), and have three uncoated portions (4) along the width direction.

In the air lift device (100), the first space part (S1) may be disposed to face the uncoated portion (4) located in the width direction central portion of the coated electrode (1). At this instance, the second space part (S2) may be disposed to face two coated portions (3) and one uncoated portion (4) of the left region (based on FIG. 2) in the width direction of the coated electrode (1). In addition, at this time, the third space part (S2) may be disposed to face two coated portions (3) and one uncoated portion (4) of the right region (based on FIG. 2) in the width direction of the coated electrode (1).

At this instance, the flow rates and pressures of the air supplied to the respective space parts (S1, S2, S3) may be individually set, and by pressurizing a partial region of the membrane member (130) through the press part (140), it is possible to differently set a spray pressure (P1) of the air sprayed toward the coated portion (3) and a spray pressure (P2) of the air sprayed toward the uncoated portion (4) through the spray part (120) in the second and third space parts (S2, S3).

In addition, referring to FIGS. 3 and 4, by moving the pressurizing member (141) along the width direction of the coated electrode (1), it is possible to differently set spray pressures of air for each region of the coated electrode (1) in response to the position of the uncoated portion and the coating pattern.

According to Boyle's law, in which the pressure and volume of the gas are inversely proportional in a state where the temperature of the gas is constant, the spray pressure sprayed from the space part to the coated electrode may be adjusted differently. That is, by pressurizing the membrane member (130) to change the shape of the space part, the volume of the region facing the uncoated portion (4) may be reduced, and as a result, the pressure sprayed in the relevant region may be increased.

Also, the compressed air supplied into the space part may be within a range of 1 bar to 5 bar.

In addition, the control part (170) may also move the pressurizing member (141) according to the position of the uncoated portion (4) of the coated electrode (1) or the coating pattern, and may also adjust pressures in the respective space parts through the regulators (161, 162, 163).

The control part (170) may be connected to a separately provided sensing part (180), such as a vision camera or a sensor, disposed to photograph the coated electrode (1). The sensing part (180) may sense coating information of the coated electrode (1), and the coating information may comprise a position of an uncoated portion or a coating pattern. The control part (170) may set the position of the pressurizing member (141) based on sensing information received from the sensing part, such as the position of the uncoated portion (4) or the coating pattern, and may also adjust pressures in the respective space parts through the regulators (161, 162, 163).

The preferred examples of the present invention as described above have been disclosed for illustrative purposes, and those skilled in the art having ordinary knowledge of the present invention will be able to make various modifications, changes, and additions within the spirit and scope of the present invention, and such modifications, changes, and additions should be regarded as falling within the scope of the following claims.

INDUSTRIAL APPLICABILITY

As described above, according to the air lift device related to one example of the present invention and the drying device for manufacturing an electrode comprising the same, when lifting a coated electrode after performing a drying process, it is possible to prevent wrinkles from occurring in an uncoated portion in a traveling process by spraying air to the uncoated portion side of the coated electrode at a higher pressure than a coated portion.

The invention claimed is:

1. An air lift device for lifting a coated electrode having a coated portion coated with an electrode slurry and an uncoated portion, the air lift device comprising:

a main body including a space part configured to receive air and a spray part configured to spray the air toward the coated electrode;

a membrane member disposed in the main body to face the space part, the membrane member being extensible; and a press part configured to set a first spray pressure of the air sprayed toward the coated portion and a second spray pressure of the air sprayed toward the uncoated portion through the spray part by pressurizing a partial region of the membrane member, the first spray pressure and the second spray pressure being different.

2. The air lift device according to claim 1, wherein the press part is configured to set the second spray pressure higher than the first spray pressure.

3. The air lift device according to claim 2, wherein the press part comprises:

a pressurizing member configured to contact the membrane member and disposed to extend the partial region of the membrane member toward the spray part; and a driving part configured to move the pressurizing member within the main body so that a contact position between the pressurizing member and the membrane member is adjusted.

4. The air lift device according to claim 3, wherein the pressurizing member is configured to contact the partial region of the membrane member facing the uncoated portion of the electrode, the membrane member is configured to convexly extend toward the spray part by the pressurizing member, and the partial region where the membrane member is convexly extended has the second spray pressure being larger than the first spray pressure of a surrounding region of the membrane member.

5. The air lift device according to claim 3, wherein the driving part is configured to move the pressurizing member along a width direction of the coated electrode.

6. The air lift device according to claim 1, further comprising an air supply part configured to supply the air into the space part, wherein the air supply part comprises a regulator configured to adjust a flow rate of the air.

7. The air lift device according to claim 1, wherein the main body has a plurality of space parts disposed along a width direction of the coated electrode, the plurality of space parts comprises a first space part, a second space part, and a third space part, the second space part and the third space part being located on opposing sides of the first space part, respectively, and each of the plurality of space parts having the membrane member and the press part.

8. The air lift device according to claim 7, further comprising:

an air supply part configured to supply air into the plurality of space parts, wherein the air supply part comprises a plurality of regulators configured to adjust a flow rate of the air supplied to each of the respective ones of the plurality of space parts.

9. The air lift device according to claim 1, wherein the spray part comprises a plurality of spray holes.

10. A drying device for manufacturing an electrode, comprising:

a drying part configured to dry a coated electrode having a coated portion coated with an electrode slurry and an uncoated portion; and a transfer part configured to move the coated electrode along a traveling direction, wherein the transfer part comprises a plurality of traveling rolls configured to contact the coated electrode moving along the traveling direction from an air lift device, the air lift device being configured to lift the coated electrode with the air, and the air lift device comprises: a main body including a space part configured to receive the air and a spray part configured to spray the air toward the coated electrode;

a membrane member disposed in the main body to face the space part, the membrane body being extensible; and a press part configured to set a first spray pressure of the air sprayed toward the coated portion and a second spray pressure of the air sprayed toward the uncoated portion through the spray part by pressurizing a partial region of the membrane member, the first spray pressure and the second spray pressure being different.

11. The drying device of claim 10, wherein the air lift device is disposed in a section where the traveling direction of the coated electrode is configured to change.

12. The drying device of claim 10, wherein the press part is configured to set the second spray pressure higher than the first spray pressure.

13. The drying device of claim 12, wherein the press part comprises a pressurizing member configured to contact the membrane member so as to extend the partial region of the membrane member toward the spray part; and a driving part configured to move the pressurizing member within the main body so that a contact position between the pressurizing member and the membrane member is adjusted.

14. The drying device of claim 13, wherein the pressurizing member is configured to contact the partial region of the membrane member facing the uncoated portion of the coated electrode, the membrane member is configured to convexly extend toward the spray part by the pressurizing member, and the partial region where the membrane member is convexly extended has the second spray pressure being larger than the first spray pressure of a surrounding region of the membrane member.

15. The drying device of claim 13, wherein the driving part is configured to move the pressurizing member along a width direction of the coated electrode.

* * * * *